United States Patent [19]

Sander et al.

[11] Patent Number: 4,770,357

[45] Date of Patent: Sep. 13, 1988

[54] ARRANGEMENT FOR STORAGE OF THE FIBERS OF GLASS-FIBER CABLES IN DISTRIBUTION DEVICES IN A TELECOMMUNICATION NETWORK

[75] Inventors: Claus Sander; Volker Roeseler; Klaus-Wilhelm Buttke, all of Berlin, Fed. Rep. of Germany

[73] Assignee: Krone Aktiengesellschaft, Berlin, Fed. Rep. of Germany

[21] Appl. No.: 945,350

[22] Filed: Dec. 22, 1986

[30] Foreign Application Priority Data

Nov. 12, 1985 [DE] Fed. Rep. of Germany ....... 3540742
Nov. 12, 1985 [DE] Fed. Rep. of Germany ....... 3540473

[51] Int. Cl.$^4$ .......................................... B65H 75/02
[52] U.S. Cl. ................... 242/54 R; 242/85.1; 350/96.21
[58] Field of Search ...................... 242/54 R, 58.6, 79, 242/180, 181, 85.1; 350/96.2, 96.21, 96.22

[56] References Cited

U.S. PATENT DOCUMENTS

| | | | |
|---|---|---|---|
| 3,494,622 | 2/1970 | Ziegler, Jr. ...................... | 242/180 X |
| 3,715,040 | 2/1973 | Polus et al. ...................... | 242/181 X |
| 4,217,030 | 8/1980 | Howarth ........................... | 350/96.21 |
| 4,266,853 | 5/1981 | Hutchins et al. ................. | 350/96.2 |
| 4,319,951 | 3/1982 | Korbelak et al. ................. | 156/502 |
| 4,428,645 | 1/1984 | Korbelak et al. ................. | 350/96 |
| 4,585,303 | 4/1986 | Pinsard et al. ................ | 350/96.21 X |
| 4,609,161 | 9/1986 | Weyand, Jr. ..................... | 242/58.6 |

FOREIGN PATENT DOCUMENTS 0101970 3/1983 European Pat. Off. .
3236213 4/1984 Fed. Rep. of Germany .
2559916 2/1984 France .

Primary Examiner—John M. Jillions
Attorney, Agent, or Firm—St. Onge, Steward, Johnston & Reens

[57] ABSTRACT

An apparatus is described for the storage of the fibers of glass-fiber cables (23) in distribution devices in a telecommunication network, such as, for example, in casings (9) of end distributors or distribution frames (10). In order to be able to store, in a break-safe and manipulatable manner a splice reserve, wound up as, for example, in a splice cassette (58) with a movable feed cable (21), at least one cassette box (1), is provided and which is designed to receive a cassette (20). The box (1) is stored in a casing (9, 10) of the distribution device, and is provided with a removal opening (7). The box (1) can be moved from an essentially vertical storage position in the casing (9, 10) to an essentially horizontal removal position with the removal opening (7) located at the top. With this structure, the ends of the glass-fiber cables (23) are, on the one hand, well-housed inside the casing (9, 10) when the box (1) is in its vertical storage position and, on the other hand, when box (1) is in its horizontal removal position easily removed through the top-located removal opening (7).

10 Claims, 5 Drawing Sheets

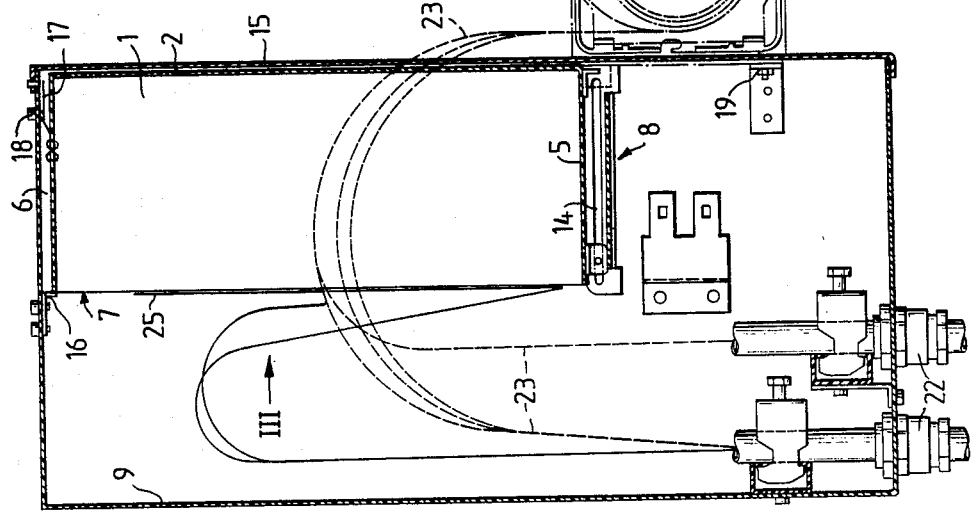
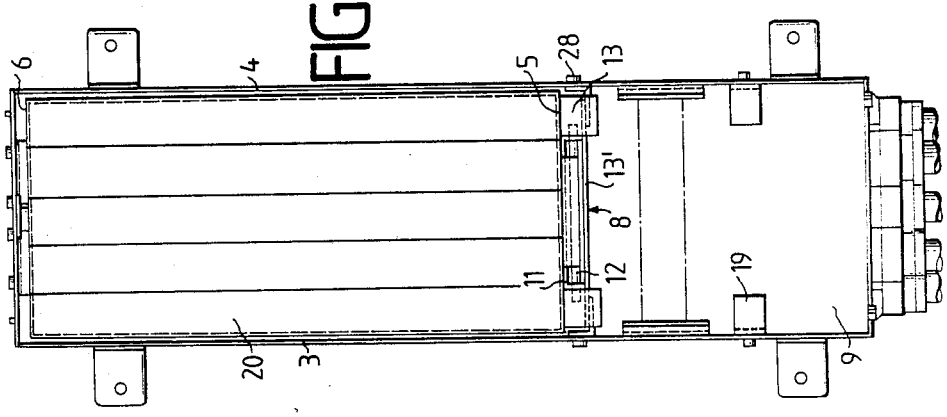

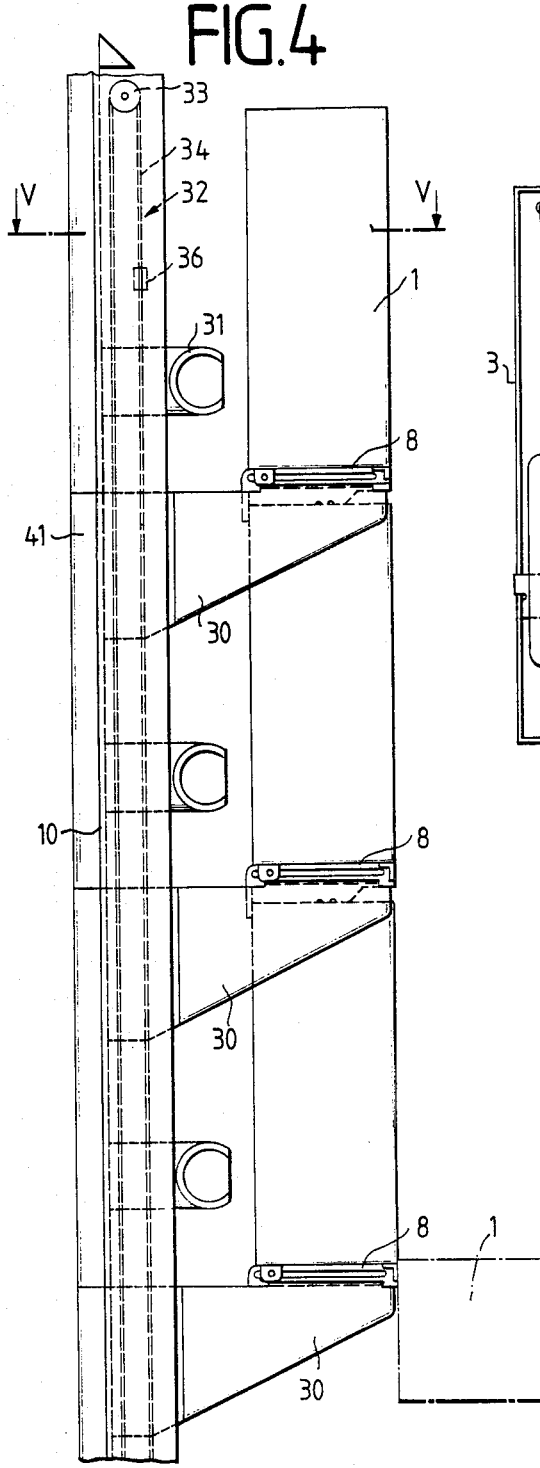
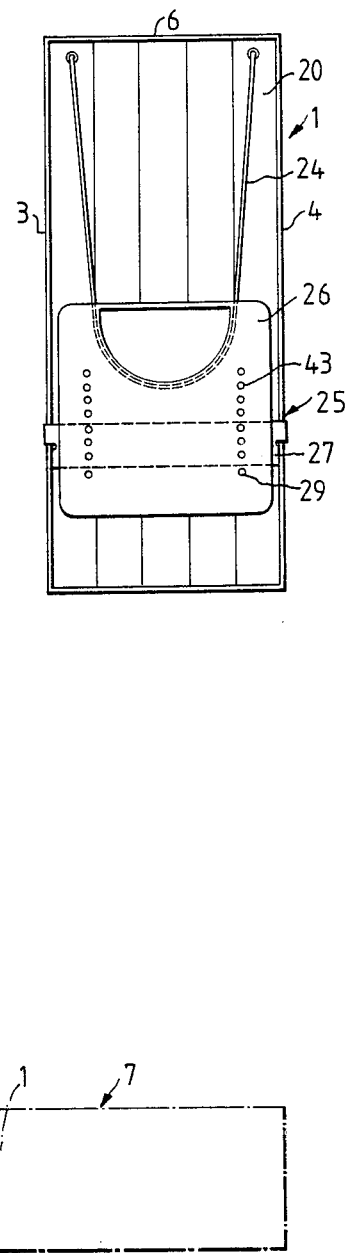

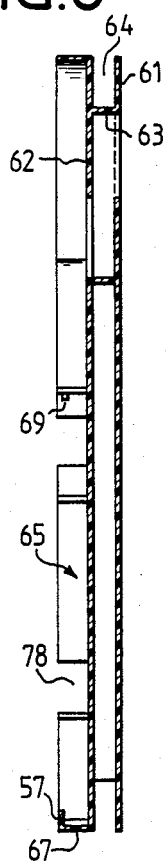
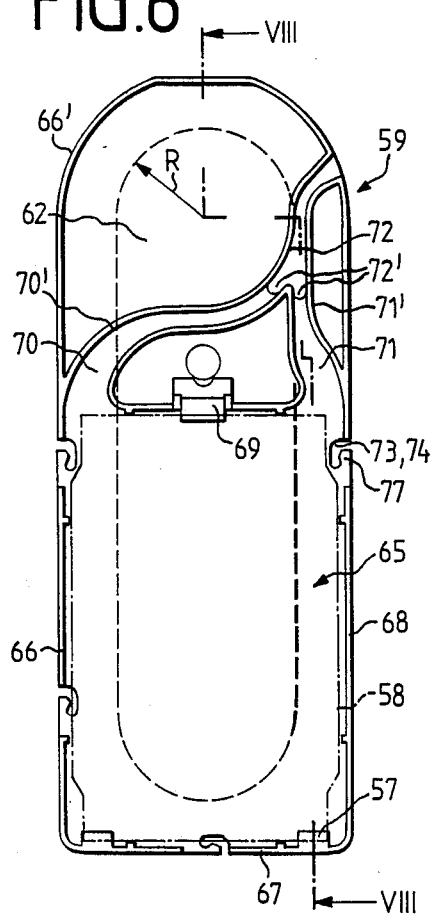
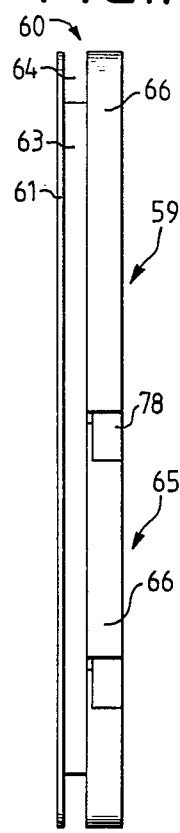
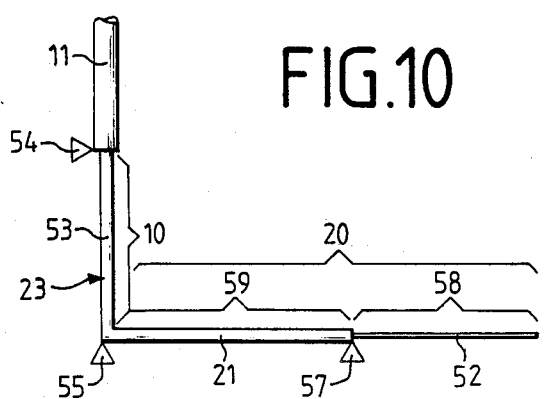

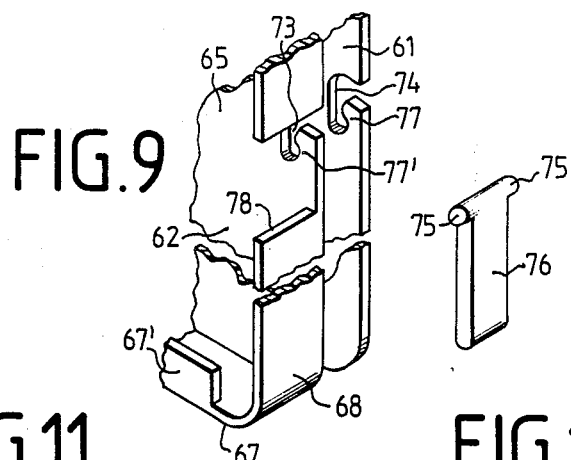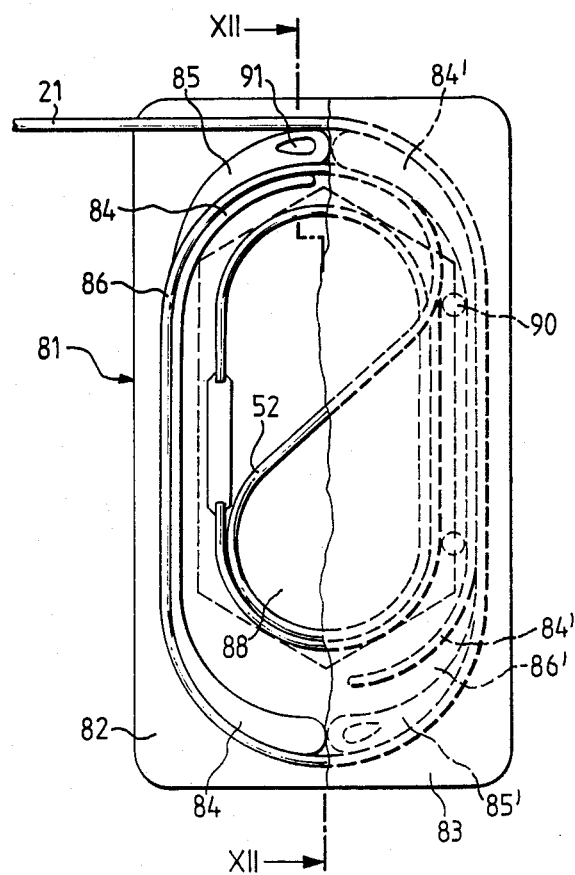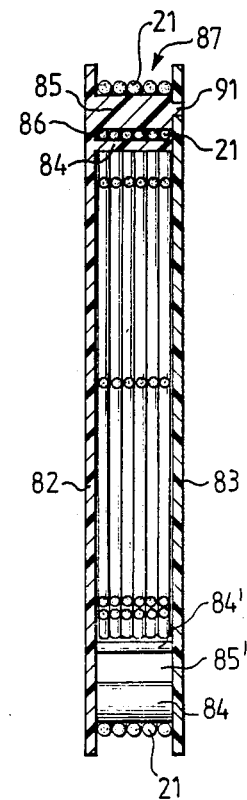

ARRANGEMENT FOR STORAGE OF THE FIBERS OF GLASS-FIBER CABLES IN DISTRIBUTION DEVICES IN A TELECOMMUNICATION NETWORK

FIELD OF THE INVENTION

This invention generally relates to the storage of glass fibers for use in a telecommunications network and more specifically to the storage of reserve fibers wound in splice cassettes.

BACKGROUND OF THE INVENTION

From European Pat. No. 0101 970, it is known to store glass fibers of glass-fiber cables as a splice reserve on splice cassettes.

The splice reserve is necessary, since the splice itself is not reusable and approximately 30 mm of glass-fiber length is lost during each repeated fiber splicing. The splice reserve is taken up in a splice cassette and typically has a length of approximately 1 meter. For splicing, the splice cassette must be supplied to a splicing table. For this purpose, between a fastening point of the glass-fiber cable and the movable splice cassette, equipped with the splice reserve, an internal distributor cable for bridging the distance between the fastening point and the place for the arrangement of the splice cassette in the casing and a movable feed cable are provided as partial lengths of the glass-fiber cable, for which purpose a glass-fiber cable length of 1 to 2 meters, particularly 1.5 meters, is required.

The movable feed cable serves to bridge the distance between the location of the splice cassette and the splicing table, onto which the splice cassette is brought for splicing.

In the known arrangement, the splice cassette is a component of a guide bar, which is pushed into the casing. The glass-fibers are wound freely about the splice cassette, in which case there is the danger of damage, particularly of breakage of the glass-fibers. In addition, the glass-fiber cable can be buckled during insertion of the bar equipped with the splice cassette into the casing, whereby the danger of breakage of the glass-fiber cable is also increased. Finally, the casing of the known device requires a relatively large construction depth, which is caused by the length of the guide bar for the splice cassette.

SUMMARY OF THE INVENTION

The invention is therefore based on the task of creating an arrangement of the above-mentioned type which makes possible an appropriate storage of the ends of glass-fiber cables, that is, of the splice reserve taken up on the slice cassette and of the feed cable length, in distribution devices in a telecommunication network, in which a simple handling is to be made possible, with a small space requirement of the arrangement.

In a solution of this task in accordance to the invention, the cassette, which contains at least the splice reserve but, in an appropriate manner, also the movable feed cable as partial lengths of the glass-fiber cable, is contained in a cassette box equipped with a removal opening, which is stored in the casing of the distribution device. The storage is provided in such a way that the cassette box can be moved from its essentially vertical storage position in the casing to its essentially horizontal removal position with the removal opening located at the top. In the removal position, the cassette can be easily removed from the removal opening of the cassette box, in order, for example, to supply the cassette to a splicing cable, during which the movable feed cable is unwound as a partial length of the glass-fiber cable from a winding form. In this manner, both the splice reserve and the movable feed cable can be stored in a break-proof manner in a distribution device in a telecommunication network. In a particularly appropriate form, the cassette box is designed to receive several cassettes located side by side.

The cassette box according to the invention can be contained as a single unit in the casing of a cable enclosure or of a distribution box. The casing for storage of the cassette box can also, in a further development according to the invention, be designed as a frame for several cassette boxes arranged one above the other. In both embodiments, the cassette box is supported by means of a slide-tilt bearing in the casing or in the frame, in order to make possible a particularly appropriate vertical storage position of the cassette box in the casing or frame and the essentially horizontal removal position where the removal opening of the cassette box is located at the top, in which case the allowable bending radii of the glass-fiber cables can be maintained. The cassette box which contains the cassettes with glass-fiber cables wound on winding forms, is arranged in such a way, with utilization of the allowable bending radii of the glass-fiber cables, that, during pushing-in and swinging-out of the cassette box, the maximum possible bending radii for the supplied glass-fiber cables or glass-fiber bundles are available.

Additional advantageous designs of the invention follow from the description. In this case, particularly reference is made to the embodiments, according to the invention, of the cassette designed as a winding form, which makes possible a particularly break-proof storage of the movable feed cable and of the splice reserve, with simple handling and small space requirement.

BRIEF DESCRIPTION OF DRAWINGS

The invention is explained in greater detail below by means of two embodiments of the device for storage of the ends of glass-fiber cables in distribution devices in a telecommunication network with winding forms in cassette form.

FIG. 1 is a vertical section view through a cable enclosure with a cassette box in the storage position (solid lines) and removal position (broken lines), FIG. 2 is a front view of the cable enclosure with the cover removed, FIG. 3 is a top view of the cassette according to arrow III in FIG. 1, FIG. 4 is a side view of a distribution frame for glass-fiber cable, equipped with several cassette boxes arranged one above the other, FIG. 6 is a top view of a winding form in a cassette, FIG. 7 is a front view of the winding form, FIG. 8 is a longitudinal section view taken along line VIII—VIII in FIG. 6, FIG. 9 is a perspective enlarged detailed view of part of a winding slot of the winding form, closable by means of a blocking element, FIG. 10 is a basic representation of the terminal partial lengths of a glass-fiber cable, FIG. 11 is a top and partial section view of another embodiment of a winding form, and FIG. 12 is a section view taken along the line XII—XII in FIG. 11.

DETAILED DESCRIPTION OF DRAWINGS

Figure 5:
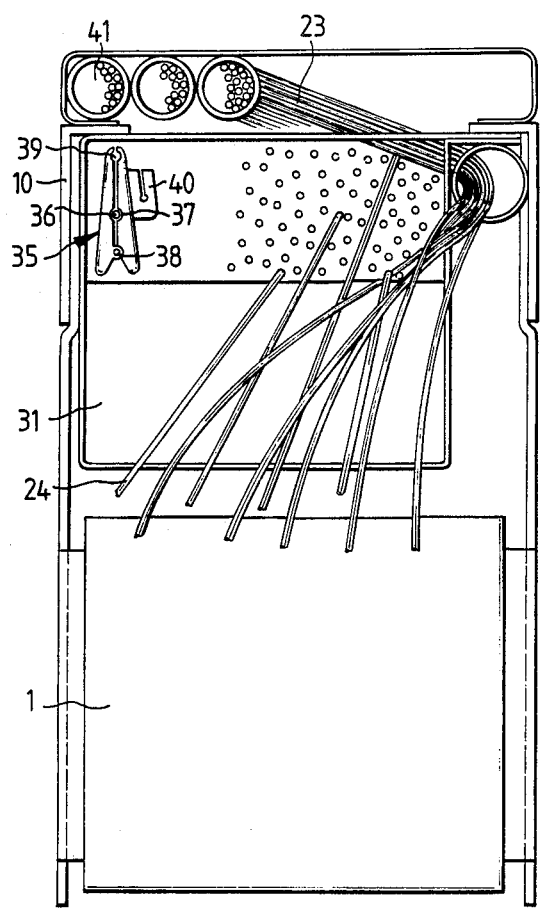
FIG. 5 is a horizontal section view taken along the line V—V in FIG. 4, on a larger scale.

The arrangement for storing the fibers of glass-fiber cables in distribution devices in a telecommunication network comprises a cassette box 1 consisting of a bottom 2, two longitudinal side walls 3, 4, and two end walls 5, 6, which surround a removal opening 7.

The cassette box 1 is supported by means of a slide-tilt bearing 8 in a casing 9 or in a frame 10. The slide-tilt bearing 8 is made up of two angle plates 11 arranged on the rear wall 5 of the cassette box 1 near the removal opening 7. A tilt axis 12 is supported in these, and two guide rails 13 are firmly attached in the casing 9 or frame 10 by means of a spacer plate 13'. Rails 13 serve as a slide bearing for the tilt axis 12 and are oriented perpendicular to the open side of the casing 9 or of the frame 10 and end at the open side. The guide rails 13 each contain a guide slot 14 for tilt axis 12. The guide rails 13 are fastened to the spacer plate 13'. In the inserted position of cassette box 1, rails 13 serve to ensure adequate stability of the slide-tilt bearing 8 and, in the removed position of the cassette box 1, it makes it possible for the interior of the casing 9 or of the frame 10 to be completely and freely accessible.

In the first embodiment according to FIGS. 1 and 2, the distribution device is a cable enclosure, which is formed from the box-shaped casing 9 and a cover 15. As shown in FIG. 1, a single cassette box 1 is inserted in the casing 9. Within the casing 9 the cassette box 1 in its storage position, is in contact with a stop 16, which is fastened to the inside of the upper wall of the casing 9 and is secured by a stop spring 17, which snaps in behind a notch 18 on the inside of the upper wall of the casing 9.

After removal of the cover 15 and release of the stop spring 17, the cassette box 1 can be withdrawn from the casing 9, during which the longitudinal walls 3, 4 and the end walls 5, 6 of the cassette box 1 are led out in parallel to respective adjacent walls of the casing 9. In this case the axis 12 is oriented within the guide slots 14 of the two guide rails 13. As soon as the tilt axis 12 has reached the front end of the guide slots 14, the cassette box 1 can be swung out by approximately 90 degrees into an essentially horizontal removal position. In this position, the receiving opening 7 faces upwardly. In this process, the tilt axis 12 forms a tilting joint. The front end wall 5 of the cassette box 1 strikes stops 19, which are firmly attached to the open side of casing 9, on the insides of the side walls.

In cassette box 1, with reference to FIGS. 3 and 6, five cassettes 20 for the movable feed cable of the glass-fiber cable 23 are arranged side by side, which in each case contain winding forms 59 (see FIG. 6) for the glass-fiber cable 23 (see FIG. 5) and splice cassettes 58 for the splice reserve 52 (see FIG. 10) of the glass-fiber cable 23. The glass-fiber cables 23 are supplied through cable inlets 22 (see FIG. 1) of the casing 9. In the removal position of the cassette box 1, cables 23 are supplied in curved form to the individual winding forms 59 located in the cassette box 1 and having splice cassettes 58 (see FIG. 6). In the vertical storage position of the cassette box 1, as shown in FIG. 1, the glass-fiber cables follow a contour that uses the winding radius of the winding form 59, and continues in a curved form from the cable inlets 22 to the winding forms 59 within the cassette box 1. In this way, the glass-fiber cables are stored in a break-safe manner both in the storage position of the cassette box 1 in the casing 9 and also in the removal position of the cassette box 1, while using an allowable bending radius.

For the reception of shunting fibers 24 (see FIG. 5), a device 25 (see FIGS. 1 and 3) is provided over removal opening 7 of cassette box 1 for the fastening of a pocket 26 (see FIG. 3) for the buckle-free stowage of the shunting fibers 24 within the cassette box 1. The device 25 comprises a bar 27 (see FIG. 3) bridging over the removal opening 7 for fastening of the pocket 26 by means of push button-like fastening elements 29. Device 25 is supported on cassettes 20 located in the cassette box 1 and, at the same time, prevents the falling-out of the cassettes 20. The pocket 26 receives the shunting fibers 24 shunted within the cassette box 1 and makes possible the adjustment of the inaccurate feed length of the shunting fibers 24 by means of freely selectable fastening holes 43.

In the second embodiment shown in FIGS. 4 and 5, several cassette boxes 1 are arranged one above the other in a distribution frame 10 for glass-fiber cables 23. Each cassette box 1 is supported by means of a slide-tilt bearing 8, which is designed analogously to the first embodiment shown in FIGS. 1 and 2, on a separate fastening bracket 30, which, in turn, is firmly connected to the frame 10.

In this manner, the cassette boxes 1 according to the second embodiment shown in FIGS. 4 and 5 can be moved in the same manner from their essentially vertical storage position into their essentially horizontal removal position with a removal opening 7 located at the top as was described in greater detail for the first embodiment according to FIGS. 1 and 2.

The frame 10, which is approximately U-shaped in horizontal cross-section, carries, above each fastening bracket 30 fastened to it, approximately semicircular guide bodies 31 for shunting fibers 24, which connect the glass-fibers 23, located in the individual cassette boxes 1 and wound up on the winding frames 59 of the cassettes 20. The guide bodies 31 are arranged on the inside of the frame 10 between this and the cassette boxes 1 when located in the storage position. To draw in the shunting fibers 24, a transport hoist 32 is supported on the inside of the U-shaped frame 10, which runs behind the cassette boxes 1 located in their vertical storage position and also behind the guide bodies 31. The transport hoist 32 for the shunting fibers 24 is formed from guide pulleys 33 supported at the upper and lower end of the frame 10 and a transport cable 34 led around this, with which a transport clamp 35 for one or more shunting fibers 24 can be detachably connected.

To fix the transport clamp 35 (see FIG. 5) to the transport cable 34, the latter is provided with a squeezed-on casing 36, onto which the transport clamp 35 is clamped with its clamping point 37. In parallel with this and on the side facing away from the center of rotation 38 of the transport clamp 35, a guide channel 39 for the other strand of the transport cable 34 is formed. On one side, the transport clamp 35 carries a clamp 40 for clamping one or more shunting fibers 24. By means of the transport hoist 32, shunting fibers 24 can be transferred in a simple manner within the frame 10 from one cassette box 1 to the other cassette box 1, without opening or removing the cassette boxes 1 located between these. The transport clamp 35 can be freely connected to the transport cable 34 and can be removed from the frame 10 for the fastening of one or more shunting fibers 24.

FIG. 5 shows, in horizontal cross-section, the guidance of several glass-fiber cables 23 and shunting fibers 24. For the guidance of the glass-fiber cables 23, guide tubes 41 of different length are attached to the backside of the frame 10, whose exit opening 42 is in each case assigned to a cassette box 1.

For easy introduction of the glass-fiber cable 23 into the frame 10, the slide-tilt bearing 8 is supported dismountably both in the casing 9 and in the frame 10. An easy dismountability is achieved by the fact that the cassette box 1 with the guide rail 13 is fastened in an easily detachable manner to the side walls of the casing frame 9 or to the fastening brackets 30 by means of screw connections 28 (see FIG. 2).

In the above-described distribution device in a telecommunication network with glass-fiber cables 23, the glass-fibers 52 of a splice reserve taken up on a splice cassette 58 are spliced outside the distribution casing 9 or frame 10 on a splicing table (not shown), in which case the splice itself is not reusable, since approximately 30 mm of the glass-fiber 52 is lost during each repeated splice.

This leads to the fact that additional partial lengths of the glass-fiber cable 23 must be movably housed in the distribution device up to the splice point located at the end of the glass-fiber 52 (FIG. 10). These movable partial lengths of the glass-fiber cable 23 are the internal distribution cable 53, which is located between a cable attachment 54 at the beginning of the frame 10 and a cable attachment 55 in the frame 10, and also the movable feed cable 21, which is arranged between the cable attachment 55 in the frame 10 and the starting point 57 of the glass-fibers 52 of the movable splice reserve wound onto the splice cassette 58.

The glass-fibers 52 of the movable splice reserve have a length of approximately 1 meter. For the reception of the movable feed cable 21, with a length of approximately 1 to 2 meters, particularly 1.5 meters, the winding frame 59 discribed below is provided. This together with the glass-fibers 52 of the movable splice reserve that is wound onto the splice cassette are stored near the cable attachment 55 and is removed from the cassette box 1 only for splicing of the glass-fibers 52 of the movable splice reserve.

The term "glass-fibers 52" refers both to individual glass-fibers and also to bundles of glass-fibers. The movable feed cable 21 can consist both of a single glass-fiber cable 23 and also of several glass-fiber cables 23. The shunting fibers 24 can also be guided parallel to the feed cables 21.

As show in FIGS. 6-9, the flat and disk-shaped winding frame 59 comprises a winding space 60, which is defined by two side walls 61, 62, which enclose a winding disk 63 of smaller surface dimensions than the side walls 61, 62, and is located between them. The winding disk 63 is rounded off at the upper and lower end of the winding frame 59 with a radius that is larger than 30 mm, in order to prevent a buckling of the glass-fibers 52 of the feed cable 21 and, if appicable, of the shunting fibers 24. The winding space 60 located between the two side walls 61 and 62 and the periphery of the winding disk 63 forms a winding slot 64 for the movable feed cable 21, so that the winding slot 64 can be adequately dimensioned to receive the necessary length of the feed cable 21 of the glass-fiber cable 23 and, if applicable, of the shunting fibers 24.

A receiving space 65 for the splice cassette 58 is provided on the outside of the side wall 62 of the winding form 59. The receiving space 65 for the splice cassette 58 is formed from webs 66 to 68 arranged on the edges of the side wall 62 of the winding form 59, whose height above the side wall 62 corresponds approximately to the thickness of a splice cassette 58 and which have a standard thickness of 8 mm. The splice cassette 58 is inserted between the inner webs 66 to 68 behind inwardly projecting hooks 57 attached to the web 67 and is detachably secured in the receiving space 65 on the free side of the receiving space 65 opposite the web 67 by means of a bolt 69, as is shown, in particular, by FIG. 6, in which the splice cassette 58 is drawn in by means of broken lines.

Instead of the splice cassette 58, with a suitable design of the webs 66 to 68, the glass-fibers 52 of the splice reserve can also be stored directly in the receiving space 65.

The area of the side wall 62 of the winding form 59 projecting beyond the receiving space 65 is provided with guide channels 70, 71 defined by web-like edges 70', 71'. The guide channels 70, 71 converge or are brought together in a guide channel 72, which serves to transfer the feed cable 21 from the plane of the receiving space 65 into the plane of the winding space 60 running parallel to this, which is formed by the winding slot 64 between the two side walls 61, 62.

The transferring guide channel 72 shows open steps 72' in the plane of the side wall 62 in the direction of the winding slot 64, and which form a tangential connection of the guide channel 70 to 72 to the outer circumference of the winding disk 63, as can be seen, in particular, from FIGS. 6 and 8. The guide channel 72 is cut free up to the outer periphery of the side wall 62, in order to enable a lateral introduction of the feed cable 56 from the guide channels 70, 71 on the upper side of the side wall 72 and thus from the receiving space 65 into the winding slot 64. The edge region of the side wall 62 above the receiving space 65 and the guide channels 70, 71 is also provided with a continuous stiffening web 66.

In the side walls 61, 62 of winding slot 64, opposed slots 73, 74 are provided at several points, which are introduced in an L-shaped manner into the material of the side walls 61, 62 and into which stop knobs 75 of blocking elements 76 can be engaged in order to prevent an undesired escape of the feed cable 56 that is wound in the winding slot 64, from the winding slot 64.

When the stop knobs 75 are pressed into the slots 73, 74, the blocking elements elastically press back the wall parts 77 of the side walls 61, 62 cut free by said slots, as a result of which the stop knobs 75 engage elastically in the troughs 77' formed behind the wall parts 77. The webs 66, 67, 68 are provided with cut-outs 78 in the region of the slots 73.

The winding form 59, with the side walls 61, 62 of the winding disk 63 and the webs 66, 66', 67, and 68, and with the defining webs 70', 70', 71' of the guide channels 70, 71, 72 is designed in such a way that it can, for example, be made in a single piece of plastic.

The additional embodiment shown in FIGS. 11 and 12 comprises a winding form 81 consisting of two parallel, essentially rectangular side walls 82, 83, which define the winding form 81 toward the outside. Each side wall 82, 83 shows guide webs 84, 85 on one half of its inside, which enclose a guide channel 86 between them. The guide web 84 corresponds to one half the circumference of an elongated oval, with the end of the guide web 84 shown at the bottom of FIG. 11 being thicker than the other end of the guide web 84 shown at the top of FIG. 11. Located opposite to this thinner end of the guide web 84, separated by the guide channel 86, is the vane-shaped guide web 85. Designed in a corresponding manner are the guide webs 84' and 85' of the other side wall 83, which guide webs 84', 85' enclose the guide channel 86'. This is located diametrically opposite to the guide channel 86 of the side wall 82.

Through a sandwich-like superposition of the two side walls 82, 83, the guide webs 84, 85 and 84', 85', are designed with an elongated oval shape, and are located close to a winding disk with an outer winding slot 87 and an inner receiving space 88. The inner receiving space 88 is intended to receive one or more bag-like pockets 89, which are combined by means of eye rings 90. In the bag-like pockets 89 are located the glass-fibers 52 of the movable splice reserve of a glass-fiber cable 23, whose movable feed cable 21 is wound up in the winding slot 87. The transfer of the movable feed cable 56 from the winding slot 87 into the receiving space 88 is carried out by means of the guide channel 86 of the side wall 82.

In the handling of the winding form 81, the bag-like pockets 89, with the glass-fibers 52 of the movable splice reserve, are first inserted into the inner space between the guide webs 84, 85 forming the receiving space 88, in which process the movable feed cable 56 is conducted through the associated guide channel 86. The other side wall 83, designed as a mirror image, is then applied, so that, after completion of the winding slot 87, the movable feed cable 21 can be inserted or wound into the winding slot 87.

Each of the two side walls 82, 83 with coordinated guide webs 84, 85 and 84', 85' can be made in a single piece of plastic. For mutual succession, stop cams 91 are provided on the guide webs 85, 85', which are pressed into correspondingly designed stop openings of the opposite side walls 82, 83.

We claim:

1. An apparatus for the storage of fibers of glass-fiber cables in a distribution device used in a telecommunication network, said apparatus comprising:
   (a) a casing for receiving at least one cassette for stock fiber lengths stored in a winding form, said cassette being removable from the casing for removal of said fibers; and
   (b) at least one cassette box for placement in said casing, said box forming a removal opening to receive said cassette, said box being movable from a substantially vertical storage position in said casing to a substantially horizontal removal position with said opening positioned at the top of said box.

2. The apparatus of claim 1, wherein said box is supported in said casing by a slide-tilt bearing means, said bearing means being formed from a tilt axis supported by at least two angle plate means arranged on an end wall means of said box, said wall means being adjacent to said opening, said axis being further supported by at least two guide rail means secured to said casing having at least one guide slot means for providing a sliding bearing surface for said axis, said slot means being aligned substantially perpendicularly to and terminating adjacent an aperture formed in the side of said casing.

3. The apparatus of claim 1 or 2, wherein said casing comprises a frame having a transport hoist means for at least one shunting fiber, said hoist having at least one guide pulley means supported adjacent an upper end of said frame and at least one guide pulley means supported adjacent a lower end of said frame, said apparatus further comprising a transport cable means for positioning around said upper and lower pulley means and a transport clamp means for detachably connecting at least one shunting fiber thereto, said transport hoist means being aligned substantially parallel to said box when said box is in said vertical storage position.

4. The apparatus according to claim 1, wherein said box is adapted to receive a plurality of cassettes for positioning therein side by side, at least one of said cassettes being equipped with a form means, said form means having means for winding a feed cable thereon, said form means further having means for receiving glass-fibers of a splice reserve, said form means further having at least one guide channel means in communication with both said winding means and said receiving means for transfer of said cable from said winding means into said receiving means.

5. The apparatus of claim 4, wherein said winding means comprises a winding slot and said receiving means comprises a cavity, and said winding slot lies in a plane substantially parallel to a plane in which said cavity lies, and said channel means lies between and connects said winding slot plane with said cavity plane.

6. The apparatus of claim 5, wherein said winding slot comprises a winding disk formed in said winding slot plane, said disk having a radius that is greater than substantially about 30 millimeters.

7. The apparatus of claim 5, wherein said cavity is formed from a plurality of web means positioned adjacent the edges of a side wall of said form means, said web means having a height H above the surface of said side wall corresponding approximately to the thickness D of said cassette.

8. The apparatus of claim 7, wherein said cassette is positioned between said web means.

9. The apparatus of claim 7, wherein said form means has a length L and said cavity has a length l, said L being greater than l, said side wall having formed outside said cavity at least one transfer channel for conducting said cable from outside said side wall to said disk.

10. The apparatus of claim 9, wherein said form means comprises two side walls superposed in a sandwich-like manner, said side walls having mirror-image, elongated, oval-shaped guide webs, said webs enclosing between them guide channels for said feed cable, said cavity having bag-like pockets for receiving glass-fibers of the movable splice reserve enclosed by said webs.

* * * * *